Patented June 22, 1943

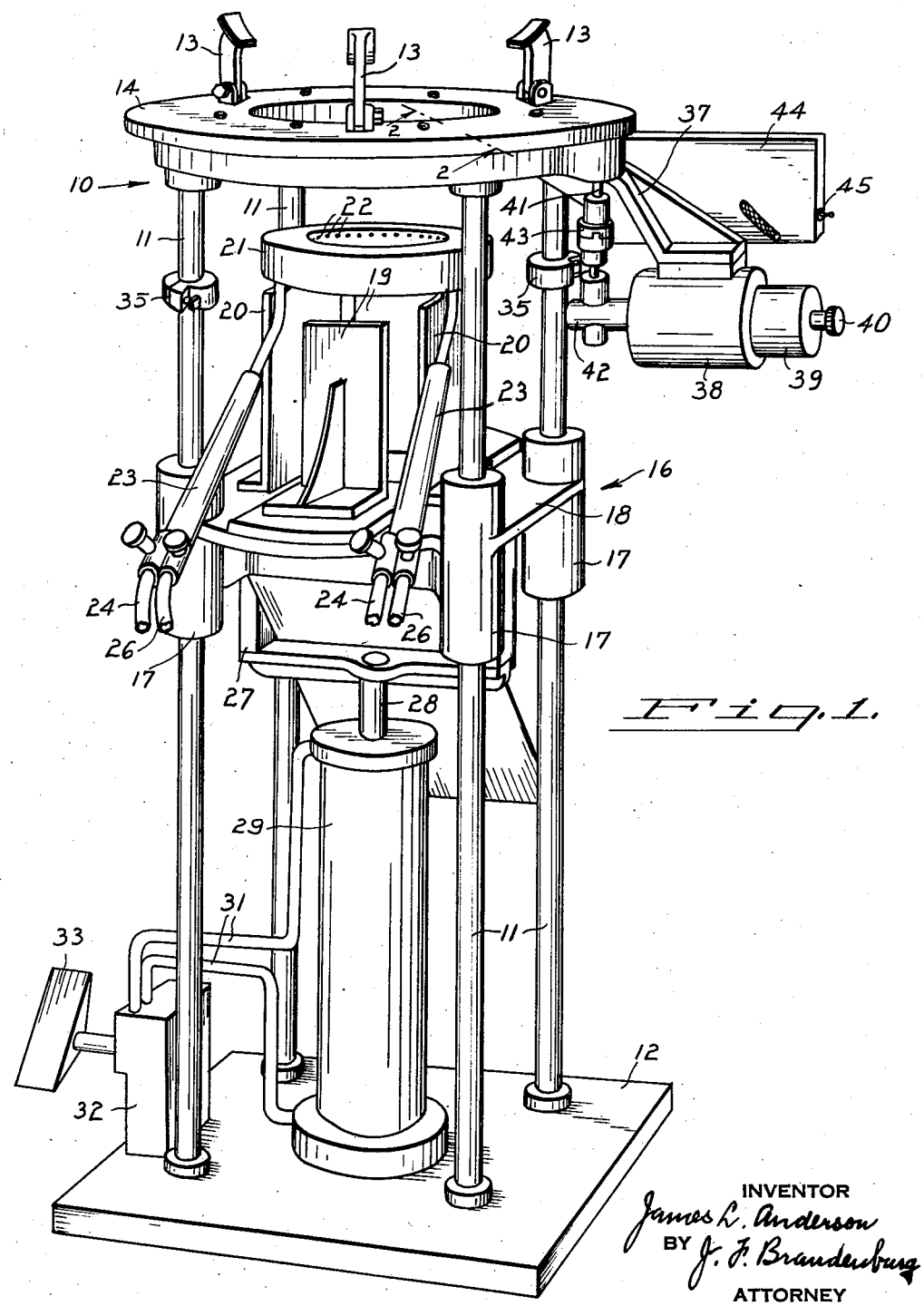

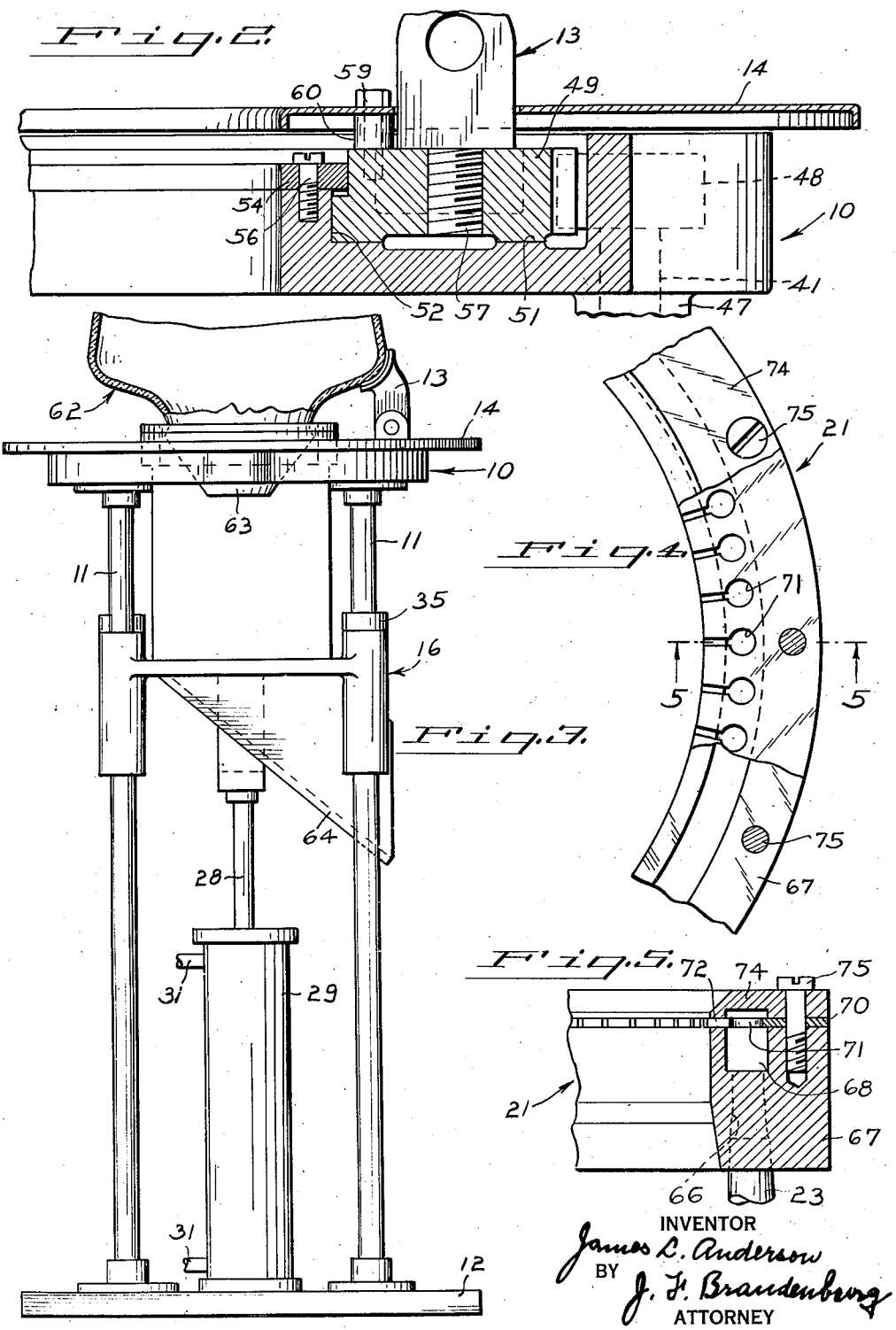

2,322,336

UNITED STATES PATENT OFFICE 2,322,336

GLASS-SEVERING MACHINE

James L. Anderson, Closter, N. J., assignor to Air Reduction Company, Incorporated, New York, N. Y., a corporation of New York Application August 3, 1940, Serial No. 350,445

5 Claims. (Cl. 49—50)

This invention relates to machines for severing the necks of blown glass articles, such as globes, and by continued fusion producing an edge with a thickened, rounded contour.

Glass articles that are made by blowing necessarily have a neck at the blowpipe end. This neck portion, also known as a moil, can be removed in various ways, one of the most advantageous of which is by directing flame jets against the glass along the desired line of severance. Flame severing of glass is quick, clean, economical, and has the additional advantage of leaving a slightly thickened and rolled edge that strengthens the article against breakage.

It is an object of this invention to provide an improved apparatus for severing glass articles by means of flame jets, and it is a more particular object to provide a simpler and more efficient machine by which the neck portion can be removed from a newly-blown glass article, such as a globe.

The preferred embodiment of the invention includes supporting means on which a glass article is placed with its neck portion extending downward and passing through an open center of the supporting means. A torch, preferably an annular torch, directs the flame jets against the glass while the article is rotated by the supporting means.

The invention comprises novel features and combinations of elements that make the machine simple in construction, and convenient and advantageous in use.

Other objects, features and advantages of the invention will appear or be pointed out as the specification proceeds.

In the accompanying drawings, forming a part hereof:

Fig. 1 is a perspective view of a glass-severing machine embodying this invention.

Fig. 2 is a much enlarged, sectional view taken on the line 2—2 of Fig. 1, with the supporting means in a different position.

Fig. 3 is a diagrammatic side elevation of the machine shown in Fig. 1, but with a glass article on the supporting means.

Fig. 4 is an enlarged view of the torch, partly broken away to illustrate the construction.

Fig. 5 is a sectional view taken on the line 5—5 of Fig. 4.

A stationary frame 10 has tubular legs 11 connected to a base 12. A globe or other newly-blown glass article is placed on supports 13 at the top of the severing machine. These supports extend upward from a cover 14 and are rotated as a unit with the cover 14 by mechanism which will be described in connection with Fig. 2. For the present it is sufficient to understand that the supports 13 rotate with the cover 14 about a vertical axis.

The top faces of the supports 13 are covered with asbestos or other refractory material on which a red-hot globe can be rested. The stationary frame 10 and cover 14 are open at the center and the glass article to be severed is placed on the supports 13 with its neck portion extending downward through these center openings.

A movable frame 16 has bearing sleeves 17 that slide up and down on the legs 11 as guides. The movable frame 16 includes a flat plate portion 18 with an open center. Guards 19, 20, on all sides of the center opening through the movable frame 16, have angular bases attached to the plate portion 18.

The upper end of one or more of the guards 20 serves as a holder for an annular torch 21 that has jet orifices 22 directed inward around the entire inner face of the torch. Gas is supplied to the torch 21 from two mixers 23, each of which receives fuel gas, preferably acetylene, through a hose 24, and oxygen through a hose 26.

A yoke 27 is connected with opposite sides of the movable frame 16 and fastened at its center to a piston rod 28 of a double-acting cylinder-and-piston motor 29 secured to the base 12. Air is supplied to opposite ends of the cylinder of the motor 29 through tubes 31 leading from a valve 32. A pedal 33 is actuated by the operator of the machine to open each of the tubes 31 alternately to a source of compressed air, or to atmosphere for exhaust.

Split clamps 35 on one or more of the tubular legs 11 serve as adjustable abutments for limiting the upward movement of the frame 16, and these clamps are located in position to stop the movable frame 16 when the torch 21 is in position to sever the neck portion of the article resting on the supports 13 along the desired line.

A bracket 37 connected to the fixed frame 10 supports a motor 38 equipped with a centrifugal governor 39 that can be adjusted by a knob 40 to operate at different speeds. The motor 38 drives a shaft 41 through reduction gearing 42 and a coupling 43. A housing 44 attached to the frame 10 supports a snap switch 45 and other control means for the motor.

The drive shaft 41 turns in a bearing 47 (Fig. 2) of the fixed frame 10, and there is a pinion 48 secured to the upper end of the shaft 41.

This pinion 48 meshes with an annular gear 49 that rests on a bearing surface 51 within the stationary frame 10, and is held against lateral displacement by a vertical bearing surface 52 within the frame. A ring 54 attached to the underlying frame 10 by screws 56 extends over a flange of the annular gear 49 to prevent the gear from being lifted out of the frame.

The lower ends of the supports 13 comprise yokes which extend through the cover 14 and have threaded ends 57 that screw into the gear 49. Screws 59 connect the cover 14 with the gear 49, and spacers 60 elevate the cover sufficiently to keep it from scraping the outer edge of the stationary frame 10.

Fig. 3 shows the position of a globe 62 when resting on the supporting means 13. The torch 21 is shown at the top of its stroke in position to direct a circle of flame jets against the neck portion 63 of the rotating globe along a desired line of severance. The severed neck portion 63 drops down against a sloping bottom wall of a chute 64 that deflects the severed glass to the right in Fig. 3 and clear of the machine. The bottom wall of the chute thus serves as a shield to protect the motor 29 from falling glass.

Figs. 4 and 5 show the preferred construction of the torch 21. The end of each of the mixers 23 screws into an inlet 66 through the bottom of an annular torch body 67. The inlet 66 opens into an arcuate recess 68 in the top surface of the torch body 67. With two mixers 23 it is sufficient that the recess 68 have an angular extent of substantially 180°, a similar recess in communication with the second mixer serving the same purpose around the other half of the annular torch.

An annular disk 70 has evenly spaced holes 71 located over the recess 68, and there is a radial slot 72 extending from each of the holes 71 to the inner edge of the annular disk. A cover plate 74 over the disk 70 is fastened to the torch body 67 by screws 75.

The cover plate 74 preferably has one or more arcuate recesses in its bottom face and such recesses, together with the holes 71 of the disk 70, and recesses 68 of the torch body 67, form the distributing chambers of the torch 21. The slots 72 comprise the jet orifices of the torch. The spacing of these orifices is shown in Fig. 4, but is exaggerated in Fig. 5 to make the drawings clearer.

Other kinds of torches can be used, and various other changes and modifications made in the preferred embodiment of the invention, and some features of the invention can be used without others.

I claim:

1. A glass-severing machine comprising a base, a stationary frame mounted on the base and comprising upwardly extending tubular legs and an annular housing connected to the upper ends of the legs, an annular gear rotatable in said housing as a bearing, supporting means on which a newly blown globe rests with its neck-end extending downward through the open center of the housing and gear, said supporting means being carried by and rotatable with said gear, a governor-controlled motor supported from the stationary frame, motion-transmitting connections including reduction gearing and a pinion, the latter meshing with the annular gear for driving said gear from the motor, a movable frame with bearings that run on the tubular legs as guides, a torch holder on the movable frame, an annular torch carried by said holder and having jet orifices for directing a ring of flame jets against the neck of the globe along the desired line of severance, a chute carried by the movable frame and including an inclined bottom wall in position to deflect a severed neck to one side of the machine, a double-acting cylinder-and-piston motor under said bottom wall, and connected at one end to the movable frame and at the other end to the base, an operator-actuated valve mounted on the machine for controlling the flow of working fluid to the cylinder, and an adjustable limit stop on at least one of the guide tubes for limiting the movement of the movable frame.

2. A machine for severing the neck from a newly-blown glass article including in combination a horizontally disposed annular gear, bearings for said gear, mechanism for rotating the annular gear on the bearings, supports rotated by the gear and on which the glass article rests with its neck-end extending downward through the opening in said gear, vertically-movable means for severing the neck, said vertically-movable means comprising an annular torch positioned with its opening in alinement with the opening in the gear, a torch support positioned below the gear, and a reciprocating rod connected to the torch support for moving the same vertically up and down for each severing operation, guide means on which the torch support is slidable, means for reciprocating the rod to move the torch between operative and inoperative position, and an abutment positioned in the path of movement of the vertically movable means for stopping movement of said vertically-movable means when the torch reaches its operative position.

3. A machine for severing the neck from a newly-blown glass article including in combination supporting means on which the glass article is held by gravity with its neck-end extending downward, vertically movable means for severing the neck, said vertically-movable means comprising an annular torch positioned with its opening in alinement with the neck of the glass article, a torch support positioned below the supporting means for the glass article, and a reciprocating rod connected to the torch support for moving the same vertically up and down for each severing operation, guide means on which the torch support is slidable, means for reciprocating the rod to move the torch between operative and inoperative position, and an abutment positioned in the path of movement of the vertically-movable means for stopping movement of said vertically-movable means when the torch reaches its operative position.

4. A glass-severing machine comprising a supporting means rotatable about a fixed vertical axis and in a fixed horizontal plane, and on which a blown glass article is held by gravity with the neck portion of said article extending downward, mechanism for rotating the supporting means, a torch holder movable up and down to bring a torch into position to cut the neck from the article on the supporting means, a fluid motor for moving the torch holder to shift the torch into and out of said position for each severing operation on successive glass articles, and an abutment in the path of one of the parts that is moved by the motor for causing the torch holder to stop in the same position for each severing operation.

5. A glass-severing machine comprising a supporting means rotatable about a fixed vertical axis and in a fixed horizontal plane, and on which a blown glass article is held by gravity with the neck portion of said article extending downward, mechanism for rotating the supporting means, a torch holder movable up and down to bring a torch into position to cut the neck from the article on the supporting means, and apparatus for moving the torch holder toward and from the supporting means to shift the torch into and out of its cutting position for each severing operation on successive glass articles, said apparatus including a double-acting cylinder and a piston motor, operator-actuated valve means for controlling the supply of working fluid to the cylinder, and an abutment in the path of one of the parts that moves with the motor for causing the torch holder to stop in the same position for each severing operation.

JAMES L. ANDERSON.